US006599446B1

(12) United States Patent
Todt et al.

(10) Patent No.: US 6,599,446 B1
(45) Date of Patent: Jul. 29, 2003

(54) ELECTRICALLY CONDUCTIVE POLYMER COMPOSITE COMPOSITIONS, METHOD FOR MAKING, AND METHOD FOR ELECTRICAL CONDUCTIVITY ENHANCEMENT

(75) Inventors: Michael Leslie Todt, Schenectady, NY (US); David Ernest Rodrigues, Malta, NY (US); Sai-Pei Ting, Slingerlands, NY (US)

(73) Assignee: General Electric Company, Niskayuna, NY (US)

( * ) Notice: Subject to any disclaimer, the term of this patent is extended or adjusted under 35 U.S.C. 154(b) by 270 days.

(21) Appl. No.: 09/705,265

(22) Filed: Nov. 3, 2000

(51) Int. Cl.[7] ............................ C08K 3/04; C08K 3/24; C08L 71/12; C08L 77/06; H01B 1/24

(52) U.S. Cl. ........................ 252/511; 252/502; 252/511; 252/509; 524/45; 524/400; 524/500; 524/538; 525/397; 525/401; 264/173.12

(58) Field of Search ................................ 252/502, 503, 252/509, 510, 511, 512, 518.1, 519.2; 524/400, 433, 495, 45, 500, 538; 264/173.12, 453; 525/397, 401

(56) References Cited

U.S. PATENT DOCUMENTS

| | | | | | |
|---|---|---|---|---|---|
| 4,451,536 | A | | 5/1984 | Barlow et al. | |
| 4,663,230 | A | | 5/1987 | Tennent | 428/367 |
| 4,752,415 | A | * | 6/1988 | Iwaskow et al. | 252/502 |
| 5,382,622 | A | | 1/1995 | Kadooka et al. | |
| 5,591,382 | A | | 1/1997 | Nahass et al. | 252/511 |
| 6,087,059 | A | * | 7/2000 | Duggan et al. | 430/108.22 |
| 6,306,203 | B1 | * | 10/2001 | Malhotra et al. | 106/31.29 |
| 6,512,446 | B2 | * | 1/2003 | Wang et al. | 338/22 R |

FOREIGN PATENT DOCUMENTS

| | | | | |
|---|---|---|---|---|
| EP | 340618 | * | 4/1989 | C08K/5/00 |
| EP | 582919 A2 | | 2/1994 | |
| JP | 5812048 | * | 9/1983 | C08L/77/00 |
| JP | 61278565 | * | 9/1986 | C08L/101/00 |
| JP | 02127467 | * | 5/1990 | C08L/77/00 |

OTHER PUBLICATIONS

Derwent Publications Ltd., London, GB; Class A85, AN 1995–16466, XP002184647 & JP 07 085722A (Gunze KK), Mar. 31, 1995.

Derwent Publications Ltd., London, GB; Class A17, AN 1976–04922X, XP002184648 & SU 455 375 A (Vasilenok YU I), Apr. 23, 1975.

* cited by examiner

*Primary Examiner*—Mark Kopec
*Assistant Examiner*—Kallambella Vijayakumar
(74) *Attorney, Agent, or Firm*—Andrew J. Caruso; Patrick K. Patnode

(57) ABSTRACT

Inclusion of relatively small amounts of organic ionic species, such as calcium stearate, in the preparation of an electrically conductive polymer composite composition provides a composition having enhanced electrical properties relative to the composite composition lacking the added organic ionic species. As a result of this enhancement, normally insulating materials which rely upon a conductive filler to render them electrically conductive, can be made to achieve a given level of conductivity using less of the conductive filler than would otherwise be required. As a result, the adverse effects of the conductive filler on the polymer's physical properties can be minimized while maintaining a high level of electrical conductivity.

14 Claims, No Drawings

ELECTRICALLY CONDUCTIVE POLYMER COMPOSITE COMPOSITIONS, METHOD FOR MAKING, AND METHOD FOR ELECTRICAL CONDUCTIVITY ENHANCEMENT

BACKGROUND OF THE INVENTION

This invention relates to electrically conductive polymer composite materials, and more particularly to methods for improving the electrical conductivity of such materials.

Normally electrically insulating polymers can be made electrically conductive via the addition of electrically conductive fillers, such as carbon fibers, carbon blacks, or metal fibers. In each case, sufficient amount of filler must be added to overcome the percolation threshold, the critical concentration of filler at which the polymer will conduct an electrical current. Beyond this threshold conductivity increases markedly as additional electrically conductive filler is added. It is believed that at the percolation threshold, uninterrupted chains of conducting particles first appear in the system. The addition of still greater amounts of electrically conductive filler produces a correspondingly higher number of uninterrupted chains and this results in still higher levels of conductivity.

Electrically conductive polymer systems are prized as materials for electromagnetic shielding in electronics applications and as materials used in the fabrication of structures to which paint may be applied using electrostatic painting techniques. A variety of electrically conductive fillers, such as carbon fibers, carbon fibrils and carbon black have been employed to impart electrical conductivity to otherwise insulating polymeric materials. The use of such fillers may however degrade other important physical characteristics of the material such as its impact strength. In addition, certain fillers such as carbon fibrils are high cost materials. Some electrically conductive fillers have a more pronounced negative effect on certain material's physical properties than others, but nearly all polymer systems incorporating them suffer a degradation of impact strength, or certain other physical property not related to conductivity, relative to the unfilled polymer systems. In many instances, the desired level of electrical conductivity cannot be obtained without sacrificing at least some part of the material's inherent impact strength. Therefore, it would be desirable to maximize the electrical conductivity enhancing effect of the conductive filler while minimizing the resultant loss in impact properties.

The instant invention is based upon the discovery that certain organic compounds function a s conductivity enhancing agents in organic conductive composite compositions, and that the inclusion of one or more of these conductivity enhancing agents reduces the amount of conductive filler required in order to achieve a given level of electrical conductivity relative to that required in the absence of the conductivity enhancing agent. The instant invention overcomes the limitations of earlier conductive composite polymer systems in that high levels of electrical conductivity can be achieved at reduced concentrations of electrically conductive filler relative to compositions lacking the conductivity enhancing agents. In this way, the present invention reduces the amount of electrically conductive filler required, thereby reducing the cost of the polymer system.

BRIEF SUMMARY OF THE INVENTION

The present invention is directed to organic conductive materials comprising a conductivity enhancing agent, said organic conductive materials having improved conductivity relative to materials lacking said conductivity enhancing agent. One aspect of the invention, therefore, is an electrically conductive polymer composite composition comprising:

(A) an organic polymer matrix;

(B) an electrically conductive filler; and (C) a conductivity enhancing agent selected from the group consisting of salts of carboxylic acids, salts of thiocarboxylic acids, salts of dithiocarboxylic acids, salts of sulfonic acids, salts of sulfinic acids, salts of phosphonic acids, salts of phosphinic acids, and mixtures thereof.

The invention further relates to methods of preparing electrically conductive polymer composite materials, to methods of enhancing the conductivity of electrically conductive polymer composite materials and articles prepared from these materials.

DETAILED DESCRIPTION OF THE INVENTION

The present invention may be understood more readily by reference to the following detailed description of preferred embodiments of the invention and the examples included herein. In this specification and in the claims which follow, reference will be made to a number of terms which shall be defined to have the following meanings.

As used herein the term "electrically conductive polymer composite composition" is used interchangeably with the term "electrically conductive polymer composite material" and refers to a composition having a measurable level of electrical conductivity, comprising an organic polymer matrix and an electrically conductive filler and optionally a conductivity enhancing agent.

As used herein the term "organic polymer matrix" refers to an organic polymer or mixture of one or more organic polymers.

As used herein the term "electrically conductive filler" refers to a material, such as carbon fibrils or carbon fibers, which when added to a nonconductive organic polymer matrix produces an electrically conductive composite material.

As used herein the term "conductivity enhancing agent" refers to an additive which when combined in a composition comprising an organic polymer matrix and an electrically conductive filler, improves the electrical conductivity of the composition, as measured by its conductivity or resistivity, relative to an otherwise identical composition lacking the conductivity enhancing agent.

The term "structural units" made in reference to polymers is used to designate the structure of repeat units within the polymer. In the case of polyphenylene ethers, structural units are understood to be derived from the monomer, or in the alternative the mixture of monomers, used in the preparation of the polyphenylene ether. For example the polyphenylene ether, poly(2,6-dimethyl-1,4-phenylene-co-2,3,6-trimethyl-1,4-phenylene ether) (CAS Number 58295-79-7), contains structural units derived from 2,6-dimethylphenol and 2,3,6-trimethylphenol.

As defined herein the term "thermoplastics" includes materials commonly referred to as "thermoplastic elastomers".

As defined herein the term "carbon fibril" includes materials commonly referred to as "carbon nanotubes" and "carbon nanofibers". In addition the term "carbon fibril" includes derivatized carbon fibrils such as metal coated carbon fibrils.

As defined herein the terms "carbon fiber" includes derivatized carbon fibers such as metal coated carbon fibers .

As used herein the term "weight percent" refers to the weight of a constituent of a composition relative to the entire weight of the composition unless otherwise indicated.

As used herein the term "aromatic radical" refers to a radical having a valency of at least one comprising at least one aromatic group. Examples of aromatic radicals include, but are not limited to phenyl, pyridyl, furanyl, thienyl, naphthyl, phenylene, biphenyl. The term includes groups containing both aromatic and aliphatic components, for example a benzyl group or the diarylmethylene group (i).

(i)

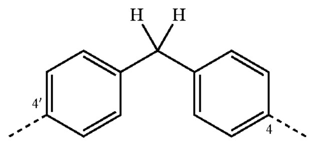

As used herein the term "aliphatic radical" refers to a radical having a valency of at least one comprising a linear or branched array of atoms which is not cyclic. The array may include heteroatoms such as nitrogen, sulfur and oxygen or may be composed exclusively of carbon and hydrogen. Examples of aliphatic radicals include, but are not limited to methyl, methylene, ethyl, ethylene, hexyl, hexamethylene, an array of carbon atoms (ii) with valencies at positions 2, 5, and 8 and the like.

(ii)

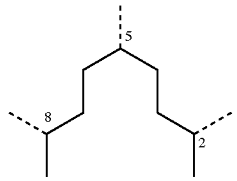

As used herein the term "cycloaliphatic radical" refers to a radical having a valency of at least one comprising an array of atoms which is cyclic but which is not aromatic. The array may include heteroatoms such as nitrogen, sulfur and oxygen or may be composed exclusively of carbon and hydrogen. Examples of cycloaliphatic radicals include, but are not limited to cyclcopropyl, cyclopentyl cyclohexyl, tetrahydrofuranyl, an array of carbon atoms (iii) with valencies indicated at positions a and b, and the like.

(iii)

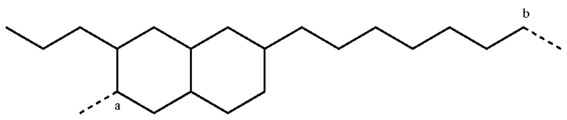

As used herein the term "$C_1$–$C_{40}$dialkylammonium" refers to an organic ammonium group bearing two alkyl groups each of which may be comprised of from 1 to 40 carbon atoms. Like terms such as $C_1$–$C_{40}$trialkylammonium, $C_1$–$C_{40}$tetraalkylammonium, $C_4$–$C_{40}$tetraarylphosphonium, $C_1$–$C_{40}$trialkylsulfonium, $C_4$–$C_{40}$ triarylsulfonium have analogous meanings. Thus a $C_1$–$C_{40}$ trialkylsulfonium ion might contain as few as three and as many as 120 carbon atoms.

Component (A) of the electrically conductive composite composition of the present invention comprises at least one thermoplastic or thermosetting polymeric material in which the electrically conductive filler, Component (B), and conductivity enhancing agent, Component (C), may be dispersed. Component (A) may include organic linear and branched thermoplastics and thermosetting materials. Where component (A) is a mixture of two or two or more polymeric components, said mixture may have the characteristics of a blend in which the components form discrete phases or a miscible blend or polymer alloy in which the polymeric components have substantial solubility in one another and tend to form a single phase composition. Alternatively, a mixture of polymeric components comprising component (A) may have characteristics intermediate between a phase separated blend and a substantially single phase material.

Polymeric materials comprising component (A) are commonly known materials which are either commercially available or prepared according to known synthetic methodology such as those methods found in *Organic Polymer Chemistry*, by K. J. Saunders, 1973, Chapman and Hall Ltd.. Examples of classes of thermoplastic polymeric materials suitable for use as component (A), either singly or in combination with another material include polyphenylene ethers, polyamides, polysiloxanes, polyesters, polyimides, polyetherimides, polysulfides, polysulfones, polyethersulfones, olefin polymers, polyurethanes and polycarbonates. Component (A) may comprise thermosetting materials as well. Examples of classes of thermosetting materials which may be used as component (A) include polyepoxides, phenolic resins, polybismaleimides, natural rubber, synthetic rubber, silicone gums, thermosetting polyurethanes and the like.

Examples of thermoplastic and thermosetting materials which may comprise component (A) include materials illustrated in (1) through (10) below. (1) Polyphenylene ethers comprising structural units I

I

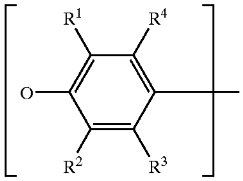

wherein $R^1$–$R_4$ are independently hydrogen, halogen, $C_1$–$C_{10}$ alkyl, $C_4$–$C_{20}$ aryl or $C_4$–$C_{20}$ cycloalkyl. Polyphenylene ethers incorporating structure units I include poly(2, 6-dimethyl-1,4-phenylene ether), poly(2,3,6-trimethyl-1,4-phenylene ether), poly(3-benzyl-2,6-dimethyl-1,4-phenylene ether), poly(2,6-diethyl-1,4-phenylene ether), poly(2-methyl-6-ethyl-1,4-phenylene ether), poly(2-methyl-6-isobutyl-1,4-phenylene ether), poly(2,6-diisopropyl-1,4-phenylene ether), poly(3-bromo-2,6-dimethyl-1,4-phenylene ether), poly(2-methyl-6-phenyl-1,4-phenylene ether), poly(2,6-diphenyl-1,4-phenylene ether) and copolyphenylene ethers such as poly(2,6-dimethyl-1,4-phenylene-co-2,3,6-trimethyl-1,4-phenylene ether) incorporating two or more of the structural units found in the homopolyphenylene ethers listed above;

(2) Polyamides comprising structural units II

II

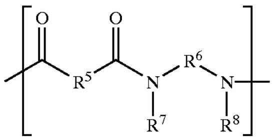

wherein $R^5$ and $R^6$ are independently $C_1$–$C_{20}$ alkylene, $C_4C_{20}$ arylene or $C_5$–$C_{20}$ cycloalkylene; $R^7$ and $R^8$ are independently hydrogen, $C_1$–$C_{20}$ alkyl, $C_6$–$C_{20}$ aryl, $C_7$–$C_{21}$ aralkyl or $C_5$–$C_{20}$ cycloalkyl; and III

III

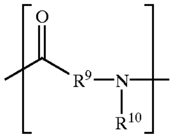

wherein $R^9$ is $C_{1\text{-}20}$ alkylene, $C_4$–$C_{20}$ arylene or $C_5$–$_{20}$ cycloalkylene; and $R^{10}$ is $C_1$–$C_{20}$ alkyl, $C_6$–$C_{20}$ aryl, $C_7$–$C_2$, aralkyl or $C_5$–$C_{20}$ cycloalkyl. Polyamides incorporating structural units II include polyamides and copolyamides obtained by polycondensation of a diamine selected from the group consisting of 1,3-diaminopropane, 1,4-diaminobutane, 1,5-diaminopentane, hexamethylenediamine, nonamethylenediamnine, undecamethylenediamine, dodecamethylenediamine and mixtures thereof; with a diacid selected from the group consisting of succinic acid, adipic acid, nonanedioic acid, sebacic acid, dodecandioic acid, terephthalic acid, isophthalic acid and mixtures thereof. Polyamides incorporating structural units III include those polyamides derived from polymerization of a-pyrrolidone, a-piperidone, caprolactam, 6-aminocaproic acid, 7-aminoheptanoic acid, 9-aminonanoic acid, 10-aminodecanoic acid, 11-aminoundecanoic acid and 12-aminododecanoic acid or mixtures thereof. Polyamides falling within the scope of the present invention which may serve as component (A) include nylon 4/6, nylon 6, nylon 6/6, nylon 6/9, nylon 6/10 and nylon 6/12.

(3) Polysiloxanes comprising structural units IV

IV

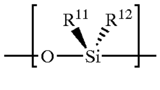

wherein $R^{11}$ and $R^{12}$ are independently $C_1$–$C_{20}$ alkyl, $C_2$–$C_{20}$ alkenyl, $C_6$–$C_{20}$aryl, $C_7$ –$C_{21}$ aralkyl or $C_5$–$C_{20}$ cycloalkyl. Polysiloxanes incorporating structural units IV include branched and linear homopolymers such as polydimethylsiloxane, polymethylphenylsiloxane, polydiphenylsiloxane, polymethylvinylsiloxane, and copolymers thereof incorporating two or more of the structural units of said homopolysiloxanes.

(4) Polyesters comprising structural units V

V

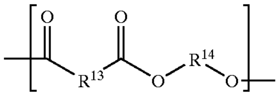

wherein $R^3$and $R^{14}$ are independently $C_1$–$C_{20}$ alkylene, $C_4$–$C_{20}$ arylene or $C_5$–$C_{20}$ cycloalkylene; and VI

VI

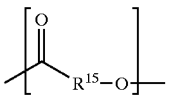

wherein $R^{15}$ is $C_1$–$C_{20}$ alkylene, $C_4$–$C_{20}$ arylene or $C_5$–$_{20}$ cycloalkylene. Polyesters incorporating structural units V and VI include poly(ethylene terephthalate), poly(butylene terephthalate), poly(ethylene 2,6-naphthalenedicarboxylate), poly(butylene 2,6-naphthalenedicarboxylate), polybutyrolactone and polyvalerolactone.

(5) Polyepoxides comprising structural units VII

VII

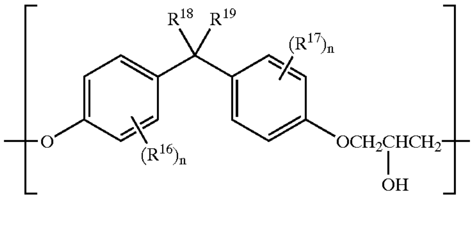

wherein $R^{16}$ and $R^{17}$ are independently at each occurrence halogen, $C_1$–$C_{20}$ alkyl, $C_6$–$C_{20}$ aryl, $C_7$–$C_{21}$a aralkyl or $C_5$–$C_{20}$ cycloalkyl; $R^{18}$ and $R^{19}$ are independently hydrogen, $C_1$–$C_{20}$ alkyl $C_6$–$C_{20}$ aryl, $C_7$–$C_{21}$ aralkyl or $C_5$ –$C_{20}$cycloalkyl, and further $R^{18}$ and $R^{19}$ may together form a $C_4$–$C_{20}$cycloaliphatic ring which may be substituted by one or more $C_1$–$C_{20}$ alkyl, $C_6$–$C_{20}$ aryl, $C_5$–$C_{21}$ aralkyl or $C_5$–$C_{20}$ cycloalkyl groups, or a combination thereof; and n is an integer from 0 to 4. Polyepoxides incorporating structural units VII include epoxy resins prepared from the mono- and diglycidy ethers of bisphenol A.

(6) Polyetherimides comprising structural units VIII

VIII

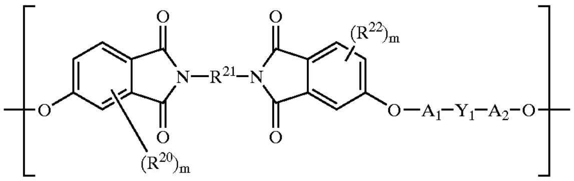

wherein R20 and R22 are independently at each occurrence halogen, $C_1$–$C_{20}$ alkyl, $C_6$ –$C_{20}$ aryl, $C_7$–$C_{21}$, aralkyl or $C_5$–$C_{20}$ cycloalkyl; $R^{21}$ is $C_2$–$C_{20}$ alkylene, $C_4$–$C_{20}$ arylene or $C_5$–$C_{20}$ cycloalkylene; each $A^1$ and $A^2$ is a is a monocyclic divalent aryl radical and $Y^1$ is a bridging radical in which one or two carbon atoms separate $A^1$ and $A^2$; and m is an integer from 0 to 3. Examples of polyether imides are Ultem® polyether imides available from the General Electric Company.

(7) Polyethersufones comprising structural units IX

IX

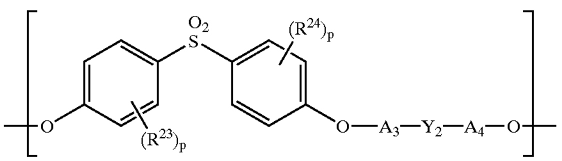

wherein R23 and R24 are independently at each occurrence halogen, $C_1$–$C_{20}$ alkyl, $C_6$ –$C_{20}$ aryl, $C_5$–$C_2$, aralkyl or $C_5$–$C_{20}$ cycloalkyl; each $A^3$ and $A^4$ is a is a monocyclic divalent aryl radical and $Y^2$ is a bridging radical in which one or two carbon atoms separate $A^3$ and $A^4$; and p is an integer from 0 to 3. Examples of polyethersulfones include those prepared from 4,4'-dichlorodiphenylsulfone and bisphenols such as bisphenol A, bisphenol Z and bisphenol M.

(8) Olefin polymers comprising structural units X

X

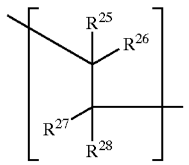

wherein $R^{25}$, $R^{26}$, $R^{27}$ and $R^{28}$ are independently at each occurrence halogen, cyano, carboxyl, $C_1$–$C_{20}$ alkoxycarbonyl, $C_1$–$C_{20}$ alkyl, $C_6$–$C_2$0aryl, $C_5$–$C_{21}$ aralkyl, $C_5$–$C_{20}$ cycloalkyl or

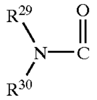

groups, wherein $R_{29}$ and $R_{30}$ are $C_1$–$C_{20}$ alkyl, $C_6$–$C_2$0 aryl, $C_7$–$C_{21}$, aralkyl or $C_5$–$C_{20}$ cycloalkyl groups; or R29 and R30 together form a $C_5$–$C_{20}$ cycloaliphatic group. Olefin polymer containing structural units X include polystyrene, polyacrylonitrile, polymaleic acid, copolymers of styrene and maleic acid, poly(acrylonitrile-co-butadiene-co-styrene), poly(acrylic acid) and poly(methyl methacrylate).

(9) Polyurethanes comprising structural XI

XI

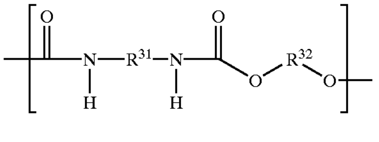

wherein $R^{31}$ and $R^{32}$ are independently $C_2$–$C_{20}$ alkylene, $C_4$–$C_{20}$ arylene, $C_4$–$C_{20}$ diarylene, $C_4$–$C_{20}$diaralkylene or $C_5$–$C_{20}$ cycloalkylene. Polyurethanes incorporating structural units XI include poly(1,$^4$-butandiol)-tolylene-2,4-diisocyante and poly[(4,4'methylenebis(phenylisocyanate)-alt- 1,4-butanediol/polytetrahydrofuran] available from Aldrich Chemical Company.

(10) Polycarbonates comprising structural units XII

XII

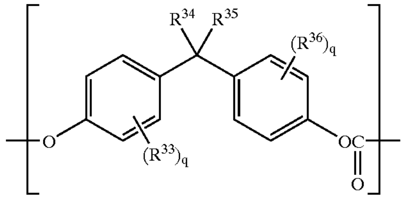

wherein $R^{33}$ and $R^{36}$ are independently at each occurrence halogen, $C_1$–$C_{20}$ alkyl, $C_6$ –$C_{20}$ aryl, $C_7$–$C_{21}$, aralkyl or $C_5$–$C_{20}$ cycloalkyl;

$R^{34}$ and $R^{35}$ are independently hydrogen, $C_1$–$C_{20}$ alkyl, $C_6$–$C_{20}$ aryl, $C_7$–$C_2$, aralkyl or $C_5$ –$C_{20}$ cycloalkyl, and further $R^{34}$ and $R^{35}$ may together form a $C_4$–$C_{20}$ cycloaliphatic ring which may be substituted by one or more $C_1$–$C_{20}$ alkyl, $C_6$–$C_{20}$ aryl, $C_5$–$C_2$, aralkyl, $C_5$–$C_{20}$ cycloalkyl groups or a combination thereof; and q is an integer from 0 to 4. Polycarbonates incorporating structural units XII include bisphenol A polycarbonate, bisphenol Z polycarbonate, bisphenol M polycarbonate, copolycarbonates incorporating bisphenol A and bisphenol Z, and polyester carbonates such as Lexan SP® available from the General Electric company.

Where component (A) comprises a polyphenylene ether and a polyamide in combination it may be desirable to include an impact modifying polymer, as part of the polymer matrix, to improve the impact resistance of articles prepared from the compositions of the present invention. Suitable impact modifying agents for the purposes of the present invention include, but are not limited to, commercially available impact modifying agents, such as Kraton® rubber impact modifiers available from Shell Chemicals. Additionally, polymeric materials prepared from styrene, ethylene, and maleic acid or maleic anhydride; polymeric materials prepared from ethylene and unsaturated carboxylic acids and their metal salts; polymeric materials prepared from olefins containing acid groups; block copolymers prepared from vinylaromatic monomers, such as styrene and alpha-methyl styrene, conjugated dienes, such as butadiene and cyclopentadiene, and unsaturated carboxylic acids and anhydrides; block copolymers prepared from vinylaromatic monomers, such as styrene and alpha-methyl styrene, olefins such as propylene, conjugated dienes, such as butadiene and cyclopentadiene, and unsaturated carboxylic acids and anhydrides may be employed. Examples of other suitable impact modifying agents are styrene-butadiene random and block copolymers, styrene-ethylene-propylene terpolymers, styrene-propylene-styrene block copolymers, styrene-butadiene-styrene block copolymers, partially hydrogenated styrene-butadiene-styrene block copolymers, fully hydrogenated styrene-butadiene-styrene block copolymers and the like.

Other additives which may be included in component (A) include compatibilizing agents such as dicarboxylic acids, tricarboxylic acids and cyclic carboxylic acid anhydrides wherein said dicarboxylic acids, tricarboxylic acids and cyclic carboxylic acid anhydrides contain at least one carbon-carbon double bond, carbon-carbon triple bond or a latent carbon-carbon double bond. Examples of dicarboxylic acids and their anhydride derivatives which may be used include maleic acid, fumaric acid, itaconic acid, 2-hydroxysuccinic acid, citric acid, 2-butynedioic acid, maleic anhydride, 2-hydroxysuccinic anhydride and citraconic anhydride. Among the forgoing examples the five membered ring cyclic anhydrides and citric acid are preferred when component (A) comprises a blend of a polyphenylene ether and a polyamide. Maleic anhydride and citric acid are particularly preferred. Other suitable compatibilizing agents include multifunctional epoxides, ortho esters, oxazolidines and isocyanates.

The electrically conductive composite compositions of the present invention may optionally include other commonly available conventional additives which enhance their utility in various applications such as the preparation of molded articles for use in computer and automotive applications. Said conventional additives include but are not limited to flame retardants, UV absorbers, antioxidants, heat stabilizers, antistatic agents and mold release agents, slip agents, antiblocking agents, lubricants, anticlouding agents, coloring agents, natural oils, synthetic oils, waxes, inorganic fillers and mixtures thereof.

Component (B) of the electrically conductive polymer composite materials of the present invention comprises at least one electrically conductive filler which when dispersed in an organic polymer matrix affords an electrically conductive material. Suitable electrically conductive fillers include carbon black , carbon fibers, carbon fibrils, carbon nanotubes, metal coated carbon fibers, metal coated graphite, metal coated glass fibers, conductive polymer filaments, metallic particles, stainless steel fibers, metallic flakes, metallic powders and the like. Electrically conductive fillers comprising component (B) are commonly known materials such as carbon balck and carbon fibrils which are either commercially available or prepared according to known synthetic methodology such as those methods found in U.S. Pat. Nos. 5,591,382 and 4,663,230. Carbon black is available from the Cabot Corporation. Vapor grown carbon fibers are commercially available from Applied Sciences Corporation. Carbon and graphite fibers are available from the Hexcel, Zoltek and Akzo Nobel corporations. Singlewall nanotubes which may likewise serve as the conductive filler are available from the Tubes@Rice and Carbolex companies. Multiwall nanotubes are available from the MER and Carbon Solutions companies among others. Metal coated fibers are available from the Composite Materials Corporation, LLC and Ostolski Laboratories. Metallic powders are available from the Bekaert Corporation.

Component (C) of the electrically conductive polymer composite materials of the present invention comprises at least one conductivity enhancing agent which when combined with components (A) and (B) affords a composition possessing a greater level of conductivity than an otherwise identical composition comprising only components (A) and (B). In one embodiment, the present invention provides conductivity enhancing agents which may be added to improve the conductivity of an already electrically conductive polymer composite material, without sacrificing other important physical properties of the material such as glass transition temperature or impact resistance. Suitable conductivity enhancing agents include the salts of carboxylic acids, salts of thio- and dithiocarboxylic acids, salts of organic sulfonic and organic sulfinic acids, and salts of organic phosphorous and organic phosphoric acids represented by structure XIII.

$R^{37}$-$(Q^1)r$

XIII wherein $R^{37}$ is a $C_1$–$C_{40}$ aliphatic radical, a $C_3$–C40 cycloaliphatic radical, or a $C_4$–$C_{40}$ aromatic radical, said radicals being optionally substituted by one or more substituents, said substituents being independently at each occurrence halogen, amino, ammonium, $C_1$–$C_{40}$ alkylamino, $C_1$–$C_{40}$dialkylamino, $C_1$–$C_{40}$ trialkylammonium, $C_4$–$C_{40}$ arylamino, $C_4$–C40 diarylamino, $C_1$–$C_{40}$ alkyl, $C_1$–$C_{40}$ alkoxy, $C_1$–$C_{40}$alkylthio, $C_1$–$C_{40}$ alkylsulfinyl, $C_1$–$C_{40}$ alkylsulfonyl, $C_3$–C40 cycloalkyl, $C_4$–$C_{40}$ aryl, $C_4$–$C_{40}$ aryloxy, $C_4$–$C_{40}$ arylthio, $C_4$–$C_{40}$ arylsulfinyl, $C_4$–$C_{40}$ arylsulfonyl, hydroxysulfonyl, hydroxy, mercapto, cyano, oxo, imino, aminoimino, hydroxyimino, alkoxyimino, nitro, nitroso, formyl, carboxyl, carboxylate, thiocarboxyl, dithocarboxyl, $C_1$–$C_{40}$alkoxycarbonyl, $C_1$–$C_{40}$ alkoxythiocarbonyl, $C_1$–$C_{40}$alkylthiocarbonyl, or phosphonyl groups;

r is an integer having a value of from 0 to about 10;

$Q^1$ is independently at each occurrence structure (a), (b), (c), (d), (e), (f), (g) or (h)

(a)

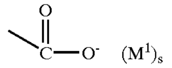

(b)

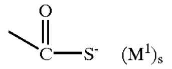

(c)

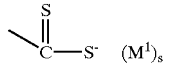

(d)

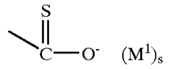

(e)

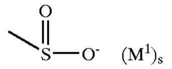

(f)

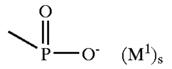

(g)

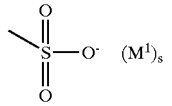

(h)

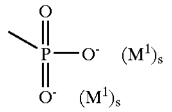

wherein $M^1$ is selected from the group consisting of monovalent metal cations, divalent metal cations , trivalent metal cations, ammonium ions, $C_1$–$C_{40}$alkylammonium ions, $C_1$–$C_{40}$ dialkylammonium ions, $C_1$–$C_{40}$trialkylammonium ions, $C_1$–$C_{40}$tetraalkylammonium ions, $C_4$–$C_{40}$ tetraarylphosphonium ions, $C_1$–$C_{40}$trialkylsulfonium ions, $C_4$–$C_{40}$ triarylsulfonium ions or $C_4$–$C_{40}$ aryl $C_1$–$C_{40}$ dialkylsulfonium ions; and s is an integer or a fraction of an integer having a value of 1, ½ or ⅓.

Groups (a)–(h) of structure XIII comprise metal cations, ammonium ions, organic ammonium ions, organic sulfonium ions and organic phosphonium ions. Conductivity enhancing agents comprising metal cations include carboxylic, thiocarboxylic, dithiocarboxylic, sulfonic, sulfinic, phosphoric and phosphorus acid salts comprising cations of lithium, sodium, potassium, rubidium, cesium, beryllium, magnesium, calcium, copper, silver, zinc, cadmium and tin. Fully ionized and partially ionized calcium salts of mono- and polycarboxylic acids having structure XIV may serve as component (C), $$R^{38}-(CO_2)_t(Ca^{++})_u(H+)_v$$

XIV wherein $R^{38}$ is a $C_1$–$C_{40}$ aliphatic radical, $C_3$–C40 cycloaliphatic radical, or a $C_4$–$C_{40}$aromatic radical; t is an integer having a value of from 1 to 10; u is an integer or half integer having a value of from ½ to 5; and v is an integer having a value of t-2u. Calcium salts of mono- and polycarboxylic acids having structure XIV are illustrated by, but are not limited to, the calcium salts of formic, acetic, propionic, butyric, valeric, octanoic, dodecandioic, tetradecanedioc, stearic, oleic, oxalic, malonic, succinic, sebacic, dodecandioic, terephthalic, 2,6-naphthalenedioic, Kemp's triacid, and 9-carboxydodecanedioic acid or mixtures thereof.

In addition, one or more salts of polymeric materials bearing one or more of the groups (a)-(h) may be used as component (C). Salts of polymeric acids such in which some or all of the carboxyl group hydrogen atoms have been exchanged with one or more suitable metal, ammonium, phosphonium or sulfonium cations are illustrated by the calcium salts of polyacrylic and polymaleic acids and the like.

Where component (C) comprises organic ammonium ions, said organic ammonium ions are illustrated by, but not limited to, tetramethylammonium decylmethylammonium, methylundecylammonium, dodecylmethylammonium, methyltridecylammonium, methyltetradecylammonium, methylpentadecylammonium, hexadecylmethylammonium, heptadecylmethylammonium, methyloctadecylammonium, decyldimethylammonium, dimethylundecylammonium, dimethyldodecylammonium, dimethyltridecylammonium, dimethyltetradecylammonium, dimethylpentadecylammonium, dimethylhexadecylammonium, dimethylheptadecylammonium, dimethyloctadecylammonium, decyltrimethylammonium, trimethylundecylammonium, dodecyltrimethylammonium, tridecyltrimethylammonium, tetradecyltrimethylammonium, pentadecyltrimethylammonium, hexadecyltrimethylammonium, heptadecyltrimethylammonium and octadecyltrimethylammonium cations. Component (C) may comprise phosphonium and sulfonium ions which are illustrated by, but not limited to, tetraphenylphosphonium, triphenylundecylphosphonium, triphenyl sulfonium and trimethylsulfonium ions.

The instant invention provides electrically conductive polymer composite materials wherein component (A), comprises from about 50 to about 99.9 weight percent of the composition, component (B) comprises from about 0.1 to about 20 weight percent of the composition, and component (C) comprises from about 0.001 to about 10 weight percent of the composition.

In a preferred embodiment, the instant invention provides electrically conductive polymer composite materials wherein component (A), comprises from about 80 to about 99.0 weight percent of the composition, component (B) comprises from about 0.1 to about 10.0 weight percent of the composition, and component (C) comprises from about 0.01 to about 5 weight percent of the composition.

In a still more preferred embodiment, the instant invention provides electrically conductive polymer composite materials wherein component (A), comprises from about 90 to about 99.0 weight percent of the composition, component (B) comprises from about 0.5 to about 2.0 weight percent of the composition, and component (C) comprises from about 0.1 to about 1 weight percent of the composition.

In an even more preferred embodiment, the instant invention provides electrically conductive polymer composite materials wherein component (A), comprises a polyphenylene ether, a polyamide and an impact modifier wherein the polyphenylene ether is present in amount in a range between about 35 and about 65 weight percent, the polyamide is present in an amount in a range between about 65 and about 35 weight percent and the impact modifier is present in a range between about 0.1 and about 20 weight percent of the total weight of the composition.

The composite compositions of the present invention may prepared using melt processing techniques. Typically, melt processing involves subjecting component (A), (B) and (C) of the electrically conductive polymer composite composition to intimate mixing at a temperature in a range between about 400 degrees Fahrenheit (° F.) and about 600° F. Melt processing in an extruder is preferred.

In one embodiment the present invention provides an electrically conductive polymer composite composition by extruding a mixture comprising components (A), (B) and (C) together with any additives such as flame retardants, UV stabilizers, mold release agents and the like at temperatures ranging from about 400° F. to about 600° F. to provide an extrudate. Coextrusion of components (A), (B) and (C) may be carried out as follows: A dry blend comprising components (A), (B) and (C) is charged to the feed inlet of an extruder and mixed and heated at temperatures ranging from about 400° F. to about 600° F. to produce an extrudate which may be pelletized for further processing into molded articles. Any vented zones in the extruder may be maintained at atmospheric pressure or adapted for a vacuum venting.

In yet another embodiment, the present invention provides an electrically conductive polymer composite composition by extruding a mixture comprising components (A), (B) and (C) as follows: A portion of component (A) together with any additives which may be desirable, such as compatibilizing agents, impact modifying agents, flame retardants, mold release agents and the like, is charged to the feed inlet of an extruder and mixed and heated at temperatures ranging from about 400° F. to about 600° F.. Component (B), dispersed in component (A) itself or in at least one component of component (A), and component (C), likewise dispersed in component (A) itself or in at least one component of component (A), are introduced at a feed inlet of the extruder closer to the die than the feed inlet used to introduce components (A). Control of the rates of introduction of the dispersions of components (B) and (C) provides a means to vary the amounts of each of the components present in the electrically conductive polymer composite composition.

Articles made from the compositions of the present invention may be obtained by forming the electrically conductive polymer composite composition by such means as injection molding, compression molding and extrusion methods. Injection molding is the more preferred method of forming the article. Among the molded articles which may be prepared from the compositions of the present invention are automotive articles such as automotive body panels, fenders and the like; and computer housings and the like.

EXAMPLES

The following examples are put forth so as to provide those of ordinary skill in the art with a detailed disclosure and description of how the methods claimed herein are evaluated, and are not intended to limit the scope of what the inventors regard as their invention. Unless indicated otherwise, parts are by weight, temperature is in degrees centigrade. The materials and testing procedures used for the results shown herein are as follows:

The organic conductive composite materials exemplifying the present invention were prepared from commercially available nylon 6,6 and polyphenylene ether (PPE available from General Electric) and graphite fibrils as the electrically conductive filler. Carbon fibril-nylon 6,6 mixtures are available from Hyperion Catalysis International.

Resistivity measurements employed standard injection molded tensile bars as follows. An injection molded tensile bar was first lightly scored and then frozen in liquid nitrogen before fracturing the tab ends off (on the score marks) to obtain the narrow section having dimensions of approximately 2.5×0.5×0.125 inches. The sample was allowed to warm to room temperature and the fractured ends were painted with conductive silver paint (sold by Ernest F. Fullam, item # 14811) to provide a uniform contact area across the entire cross section. Resistance was measured on a Wavetek RMS225 ohm-meter for samples having resistance values less than 40 MΩ or on a Keithley 617 electrometer for samples having resistance values between 40 MΩ and 200 GΩ. The specific volume resistivity (SVR or bulk resistivity) of the sample was calculated by multiplying the measured resistance times the cross sectional area of the bar divided by the length of the bar.

Notched IZOD impact test values were obtained at room temperature and are reported in foot-pounds per inch (ft.lb/in).

EXAMPLE 1

A dry blend of 40.72 parts PPE, poly(2,6-dimethyl-1,4-phenylene)ether, having an intrinsic viscosity of about 0.4 deciliters per gram (dlg) as measured in chloroform at 30° C., 7.43 parts Kraton G1651 and 3.71 parts Kraton G1701 impact modifier, 0.1 parts potassium iodide, and 0.01 parts copper iodide was fed at a rate of 20.74 pounds per hour (phr) to the throat of a twin screw extruder operated at 290° C. at 400 rpm. Simultaneously, a blend of 38.03 parts nylon 6,6 powder, 5.90 parts nylon 6,6-carbon fibril mixture containing 20.0 percent by weight carbon fibrils, and 4.20 parts of a dispersion of calcium stearate powder in ground nylon 6,6 containing 5.0 percent by weight calcium stearate, was fed at a rate of 19.25 phr through a downstream inlet of the extruder. The extruded composite composition contained 1.20 percent by weight carbon fibrils based on the total weight of the composition and 0.45 percent by weight calcium stearate based upon the weight of nylon 6,6.

Comparative Example 1

The control sample was produced as in Example 1 with the exception that nylon 6,6 was substituted for the nylon 6,6-calcium stearate mixture. The resultant organic conductive material had a fibril concentration of 1.2% by weight based on the total weight of the composition, and the same relative amounts of nylon 6,6 and PPE as in the composition of Example 1 and a bulk resistivity of 14.54 K ohm-cm Examples 2–5, in which the weight fraction of carbon fibrils was maintained at 1.2 percent based on the total weight of the composition while varying the amount of calcium stearate, were prepared in a manner analogous to Example 1 using the same relative amounts of nylon 6,6 and PPE.

Examples 6–8, in which the weight fraction of calcium stearate was .maintained at 0.9 percent based on the total weight of nylon 6,6 while varying the amount of carbon fibrils, were prepared in a manner analogous to Example 1 using the same relative amounts of nylon 6,6 and PPE.

Examples 9–14 were prepared in a manner analogous to that employed in Example 1 using the same relative amounts of nylon 6,6 and PPE, wherein a conductivity enhancing agent other than calcium stearate was added as a 5% dispersion in nylon 6,6 powder. The compositions of Examples 9-15 comprise 1.2 weight percent carbon fibrils. The materials of Examples 9–14 contained 0.9 weight percent calcium stearate based upon the weight of nylon 6,6.

TABLE 1

EFFECT OF CALCIUM STEARATE ON RESISTIVITY AND IMPACT PROPERTIES

| Example | [Ca Stearate][a] | SVR[b] | IZOD[c] |
|---|---|---|---|
| Comparative Example 1 | 0% | 14.54 | 4.63 |
| Example 1 | 0.45% | 9.06 | 4.68 |
| Example 2 | 0.90% | 0.57 | 4.07 |
| Example 3 | 1.35% | 3.38 | 4.24 |
| Example 4 | 1.8% | 0.59 | 3.89 |
| Example 5 | 2.25% | 0.36 | 3.08 |

[a]Weight percent calcium stearate with respect to total nylon 6,6.
[b]Specific volume resistivity in kΩ-cm.
[c]ft-lb/in.

Table I illustrates the effect of calcium stearate on electrical and impact properties of polyphenylene ether-nylon 6,6-carbon fibril composite compositions comprising about 40.72 parts polyphenylene ether, about 46.74 parts nylon 6,6, about 11.14 parts impact modifiers, about 1.2 parts carbon fibrils and calcium stearate in a range between about 0 and about 2.5 weight percent based upon the weight of nylon 6,6 present in the composition. It can be seen that the SVR decreases steadily as the amount of calcium stearate in the composition is increased.

As a result of calcium stearate addition, less of the conductive filler is required to achieve the desired level of electrical conductivity and there is little effect on impact strength. This is demonstrated in Table 2 wherein the level of calcium stearate is maintained at 0.9 weight percent with respect to the weight of nylon 6,6 while the amount of carbon fibrils is varied. As illustrated in Example 7, the presence of the 0.9% calcium stearate together with 0.8 % carbon fibrils affords composite composition having conductivity superior to a control sample containing 30 percent more carbon fibrils, Comparative Example 1.

TABLE 2

EFFECT OF CARBON FIBRIL LOADING ON RESISTIVITY AT IMPACT PROPERTIES AT CONSTANT CALCIUM STEARATE LOADING

| Example | [C Fibril][a] | SVR[b] | IZOD[c] |
|---|---|---|---|
| Comparative Example 1[d] | 1.2% | 14.54 | 4.63 |
| Example 2 | 1.2% | 0.57 | 4.07 |
| Example 6 | 1.0% | 1.45 | 3.84 |
| Example 7 | 0.8% | 3.85 | 4.27 |
| Example 8 | 0.6% | 127,000 | 4.27 |

[a]Weight percent carbon fibril
[b]Specific volume resistivity in kΩ-cm.
[c]ft-lb/in.
[d]Contains no calcium stearate Table 3 illustrates the relative effectiveness of a variety of carboxylic acid salts at reducing the resistivity ( i.e. enhancing the conductivity) of conductive polymer blends.

TABLE 3

| EXAMPLES OF EFFECT OF COMPONENT C ON RESISTIVITY. | | |
|---|---|---|
| Example | Component C[a] | SVR[b] |
| Comparative Example 1[c] | none | 14.54 |
| Example 2 | Calcium Stearate | 0.57 |
| Example 9 | Tin Stearate | 7.16 |
| Example 10 | Calcium Montanate[d] | 4.17 |
| Example 11 | Magnesium Stearate | 3.38 |
| Example 12 | Sodium Stearate | 10.3 |
| Example 13 | Lithium Stearate | 12.9 |
| Example 14 | Zinc Stearate | 1.33 |

[a]All samples contained 1.2 weight percent carbon fibril and 0.9 weight percent calcium stearate based upon the weight of nylon 6,6.
[b]Specific volume resistivity in kΩ-cm.
[c]Contains no calcium stearate.
[d]Calcium salt of montanic acid CAS# 68308-22-5.

The invention has been described in detail with particular reference to preferred embodiments thereof, but it will be understood that variations and modifications can be effected within the spirit and scope of the invention.

What is claimed is:

1. An electrically conductive polymer composite composition comprising:

(A) an organic polymer matrix;

(B) an electrically conductive filler; and (C) a conductivity enhancing agent comprising calcium stearate, said organic polymer matrix (A) comprising polyphenylene ether structural units corresponding to structure I

I

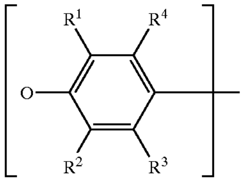

wherein $R^1$–$R_4$ are independently hydrogen, halogen, $C_1$–$C_{10}$ alkyl, $C_4$–$C_{20}$ aryl, or $C_4$ –$C_{20}$ cycloalkyl; and polyamide structural units corresponding to structure II or III

II

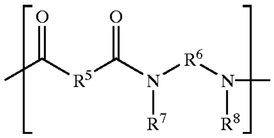

III

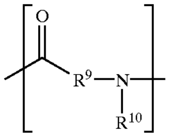

wherein $R^5$ and $R^6$ are independently $C_1$–$C_{20}$ alkylene, $C_4$–$C_2$0 arylene, or $C_5$–$C_{20}$ cycloalkylene, $R^7$ and $R^8$ are independently hydrogen, $C_1$–$C_{20}$ alkyl, $C_1$–$C_{20}$ aryl, $C_7$–$C_{21}$ aralkyl, or $C_5$–$C_{20}$ cycloalkyl, $R^9$ is $C_1$–$C_{20}$ alkylene, $C_4$–$C_{20}$ arylene, or $C_5$–$C_{20}$ cycloalkylene, and $R^{10}$ is $C_1$–$C_{20}$ alkyl, $C_6$–$C_{20}$aryl, $C_7$–$C_{21}$, aralkyl, or $C_5$–$C_{20}$cycloalkyl;

said electrically conductive filler (B) comprising carbon fibrils, said component (A) being present in ant amount between about 50 and about 99.9 percent, said component (B) being present in an amount between about 0.1 and about 20 percent and said component (C) being present in an amount between about 0.001 and about 10 percent, based on the total weight of the composition.

2. A composition according to claim 1 further comprising at least one impact modifying agent, said impact modifying agent being present in an amount between about 0.1 and about 20 weight percent based upon the total weight of the composition.

3. A composition according to claim 2 in which component (A) comprises poly(2,6-dimethyl-1,[4]-phenylene ether) and nylon 6,6.

4. A method of making an electrically conductive polymer composite composition comprising:

(A) an organic polymer matrix;

(B) an electrically conductive filler; and (C) a conductivity enhancing agent comprising calcium stearate;

said method comprising mixing components (A), (B) and (C) under melt processing conditions, said organic polymer matrix (A) comprising polyphenylene ether structural units corresponding to structure I

I

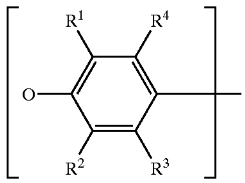

wherein $R^1$–$R_4$ are independently hydrogen, halogen, $C_1$–$C_{10}$ alkyl, $C_4$–$C_{20}$ aryl, or $C_4$–$C_{20}$ cycloalkyl; and polyamide structural units corresponding to structure II or III

II

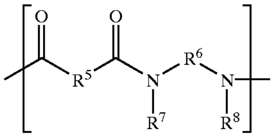

III

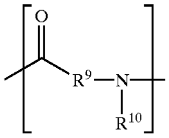

wherein $R^5$ and $R^6$ are independently $C_1$–$C_{20}$ alkylene, $C_4$–$C_{20}$ arylene, or $C_5$–$C_{20}$ cycloalkylene, and $R^7$ and $R^8$ are independently hydrogen, $C_1$–$C_{20}$ alkyl, C6–$C_{20}$ aryl, $C_7$ –$C_{21}$, aralkyl, or $C_5$–$C_{20}$ cycloalkyl, $R^9$ is $C_1$–$C_{20}$ alkylene, $C_4$–$C_{20}$ arylene, or $C_5$–$C_{20}$ cycloalkylene, and $R^{10}$ is $C_1$–$C_{20}$ alkyl, $C_6$–$C_{20}$ aryl, $C_7$–$C_{21}$ aralkyl, or $C_5$–$C_{20}$ cycloalkyl;

said electrically conductive filler (B) comprising carbon fibrils, said component (A) being present in an amount between about 50 and about 99.9 percent, said component (B) being present in an amount between about 0.1 and about 20 percent and said component (C) being present in an amount between about 0.001 and about 10 percent, based on the total weight of the composition.

5. A method according to claim 4 further comprising at least one impact modifying agent, said impact modifying agent being present in an amount between about 0.1 and about 20 weight percent based upon the total weight of the composition.

6. A method according to claim 5 in which component (A) comprises poly(2,6-dimethyl-1,4-phenylene ether) and nylon 6,6.

7. A method of enhancing the electrical conductivity of an electrically conductive polymer composite composition comprising:

(A) an organic polymer matrix; and (B) an electrically conductive filler;

said method comprising combining components (A) and (B) under melt processing conditions with a conductivity enhancing agent (C) comprising calcium stearate, said organic polymer matrix (A) comprising polyphenylene ether structural units corresponding to structure I

I

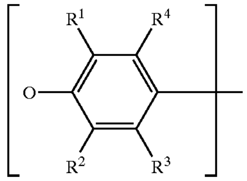

wherein $R^1$–$R_4$ are independently hydrogen, halogen, $C_1$–$C_{10}$ alkyl, $C_4$–$C_{20}$ aryl, or $C_4$–$C_{20}$ cycloalkyl; and polyamide structural units corresponding to structure II or III

II

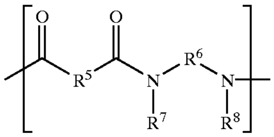

III

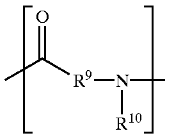

wherein $R^5$ and $R^6$ are independently $C_1$–$C_{20}$ alkylene, $C_4$–$C_{20}$ arylene, or $C_5$–$C_{20}$ cycloalkylene, $R^7$ and $R^8$ are independently hydrogen, $C_1$–$C_{20}$ alkyl, $C_6$–$C_{20}$ aryl, $C_7$–$C_{21}$ aralkyl, or $C_5$–$C_{20}$ cycloalkyl, $R^9$ is $C_1$–$C_{20}$ alkylene, $C_4$–$C_{20}$ arylene, or $C_5$–$C_{20}$ cycloalkylene, and $R^{10}$ is $C_1$–$C_{20}$ alkyl, $C_6$–C20 aryl, $C_7$–$C_{21}$, aralkyl, or $C_5$–$C_{20}$cycloalkyl;

said electrically conductive filler (B) comprising carbon fibrils, said component (A) being present in an amount between about 50 and about 99.9 percent, said component (B) being present in an amount between about 0.1 and about 20 percent and said component (C) being present in an amount between about 0.001 and about 10 percent, based on the total weight of the composition.

8. A method according to claim 7 further comprising at least one impact modifying agent, said impact modifying agent being present in an amount between about 0.1 and about 20 weight percent based upon the total weight of the composition.

9. A method according to claim 8 in which component (A) comprises poly(2,6-dimethyl-1,4-phenylene ether) and nylon 6,6.

10. An electrically conductive polymer composite composition comprising:

(A) an organic polymer matrix comprising poly(2,6-dimethyl-1,4-phenylene ether) in an amount equivalent to about 35 to about 65 weight percent, nylon 6,6 in an amount equivalent to about 65 to about 35 weight percent, and an impact modifier in an amount equivalent to about 5 to about 15 weight percent;

(B) an electrically conductive filler comprising carbon fibrils in an amount equivalent to from about 0.1 to about 2.0 weight percent; and (C) a conductivity enhancing agent comprising calcium stearate in an amount equivalent to about 0.1 and about 2.0 weight percent; wherein weight percent refers to the weight percent of the component relative to the total weight of the composition.

11. A molded article prepared from the composition of claim 10.

12. A method of preparing an electrically conductive polymer composite composition comprising:

(A) an organic polymer matrix comprising poly(2,6-dimethyl-1,4-phenylene ether) in an amount equivalent to about 35 to about 65 weight percents nylon 6,6 in an amount equivalent to about 65 to about 35 weight percent, an impact modifier in an amount equivalent to about 5 to about 15 weight percent;

(B) an electrically conductive filler comprising carbon fibrils in an amount equivalent to about 0.1 to about 2.0 weight percent; and (C) a conductivity enhancing agent comprising calcium stearate in an amount equivalent to about 0.1 and about 2.0 weight percent;

wherein weight percent refers to the weight percent of constituent relative to the total weight of the composition;

said method comprising combining components (A), (B) and (C) under melt processing conditions.

13. A method according to claim 12 wherein the poly(2,6-dimethyl-1,4-phenylene)ether and impact modifier are first melt mixed under melt processing conditions at a temperature in a range between about 270 and 320° C., and thereafter nylon 6,6 carbon fibrils and calcium stearate are added to the mixture of poly(2,6-dimethyl-1,4-phenylene) ether and impact modifier, and the whole is subjected to further melt processing.

14. A method of enhancing the electrical conductivity of an electrically conductive polymer composite composition comprising:

(A) an organic polymer matrix comprising poly(2,6-dimethyl-1,4-phenylene ether) in an amount equivalent to about 35 to about 65 weight percent, nylon 6,6 in an amount equivalent to about 6 5 to about 3 5 weight percent, an impact modifier in an amount equivalent to about 5 to about 15 weight percent; and (B) an electrically conductive filler comprising carbon fibrils in an amount equivalent to from about 0.1 to about 2.0 weight percent;

wherein weight percent refers to the weight percent of constituent relative to the total weight of the composition;

said method comprising combining components (A) and (B) with a conductivity enhancing agent comprising calcium stearate in an amount equivalent to about 0.1 to about 2.0 weight percent calcium stearate based upon the total weight of the composition.

* * * * *